No. 861,713.
PATENTED JULY 30, 1907.
W. H. DOW.
SHEARS.
APPLICATION FILED MAY 14, 1907.
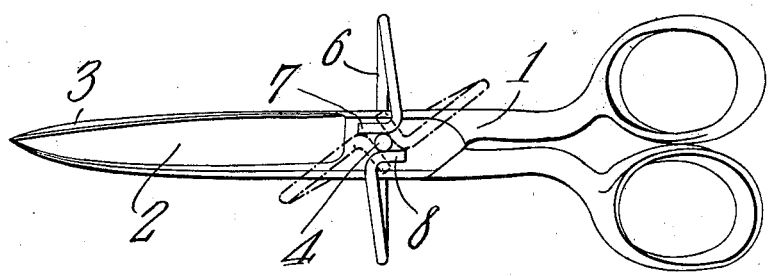
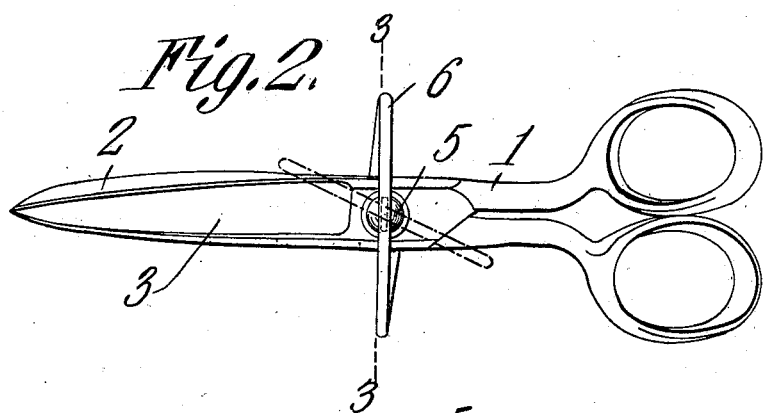
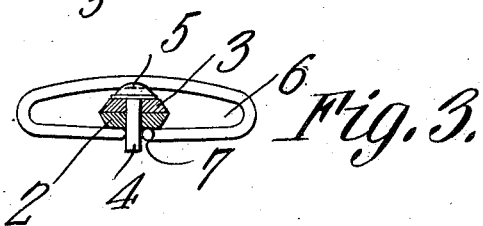
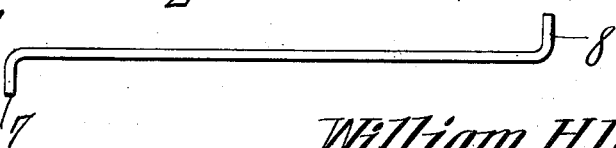
William H. Dow,
INVENTOR.
WITNESSES:
By C. A. Snow & Co.
ATTORNEYS

UNITED STATES PATENT OFFICE.

WILLIAM HENRY DOW, OF BURLINGTON, VERMONT.

SHEARS.

No. 861,713.

Specification of Letters Patent.

Patented July 30, 1907.

Application filed May 14, 1907. Serial No. 373,551.

*To all whom it may concern:*

Be it known that I, WILLIAM HENRY DOW, a citizen of the United States, residing at Burlington, in the county of Chittenden and State of Vermont, have invented a new and useful Shears, of which the following is a specification.

This invention relates to an improvement in shears and like cutting implements, the object of the invention being to provide a novel means for retaining in place the pivot pin of a pair of shears and to keep their cutting edges always in contact.

The device is simple, cheap and efficacious, and can be applied to scissors and shears of all kinds, holding the pivot in place and preventing any wear thereon from loosening the blades and causing them to separate and spread apart when cutting, in a manner common to such implements at the present time.

In the accompanying drawings: Figure 1 is a view of a pair of shears as seen from one side, with the invention applied. Fig. 2 is a similar view of the shears as seen from the other side. Fig. 3 is a cross section on the line 3—3 of Fig. 2. Fig. 4 is a view of the blank before final bending into shape.

Similar numerals of reference are used for the same parts on all the figures.

The numeral 1 indicates a pair of shears or scissors of any kind having two coacting blades 2 and 3 united by a pivot 4. It is usual to employ a screw for the pivot of shears, but with this invention a straight pin, having a projecting head 5 nicked like a screw head, is preferable, although a screw may be used. The pivot pin 4 is straight and readily passed through the perforations formed for it in the blades; and is of such length as to project a short distance beyond the side of the shears as shown in Fig. 3.

Seated in the nick in the head 5 of the pin on one side of the shears and against the blade on the opposite side is a spring loop 6, sufficiently long to permit the blades to open to their full extent. The spring loop 6 consists of a length of wire or spring sheet metal having its ends 7 and 8 bent in opposite directions, (see Fig. 4) and then folded near each end upon itself to bring the bent ends 7 and 8 in close relation to, and parallel with each other, and spaced from the body of the loop a distance less than that from the nick in the head of the pin 4 to the opposite face of the blade, so that when the loop is applied to a pair of shears in the manner shown in the drawing, the blades will be held in contact, and the pivot pin in place, by spring pressure. The projecting end of the pivot pin 4 will pass between the ends 7 and 8 of the loop wire which latter, lying flat on the shear blade, prevent the loop from twisting.

The pivot pin, as heretofore stated, is free to turn, thus enabling the loop 6 to be folded close against the shears in either direction as represented by dotted lines in Figs. 1 and 2.

Having thus described the invention what is claimed is:—

1. A pair of shears or scissors, combined with an elongated spring loop entirely surrounding them the ends of said loop extending beyond the edges thereof, one side of said loop bearing against the pivot and its opposite side against the shears or scissors.

2. A pair of shears or scissors, and a pivot with a nicked head connecting the blades thereof, combined with an elongated spring loop surrounding them, the sides of said loop bearing respectively on the nicked head of the pivot and the opposite side of the shears or scissors.

3. A pair of shears or scissors having a loose, headed pivot pin, combined with an elongated spring loop surrounding said shears, the sides of said loop bearing respectively against said pivot pin and the side of the shears opposite.

4. A pair of shears or scissors having a loose, headed pivot pin, combined with an elongated spring loop open on one side and surrounding said shears or scissors, the closed side of said loop bearing on the head of said pivot and the open side against the side of the shears.

5. A pair of scissors or shears having a loose, headed pivot pin, combined with an elongated spring loop open on one side and surrounding said shears, the closed side of said loop seated in a nick in the head of the pivot pin, and the open side having parallel portions extending in opposite directions bearing on the opposite side.

6. Combined with a pair of shears having a loose, headed pivot pin, an elongated spring loop surrounding said shears the sides of said loop bearing respectively against the head of said pin and the side of the shears, the latter side of the loop being open and having parallel portions extending in opposite directions and lying flat against the side of said shears.

In testimony that I claim the foregoing as my own, I have hereto affixed my signature in the presence of two witnesses.

WILLIAM HENRY DOW.

Witnesses:
   GILBERT A. DOW,
   M. C. GRANDY.